US012115560B2

(12) United States Patent
Tan

(10) Patent No.: US 12,115,560 B2
(45) Date of Patent: Oct. 15, 2024

(54) WIPING DEVICE AND MACHINE

(71) Applicant: TRIPLE WIN TECHNOLOGY(SHENZHEN) CO. LTD., Shenzhen (CN)

(72) Inventor: Yong Tan, Shenzhen (CN)

(73) Assignee: TRIPLE WIN TECHNOLOGY(SHENZHEN) CO. LTD., Shenzhen (CN)

( * ) Notice: Subject to any disclaimer, the term of this patent is extended or adjusted under 35 U.S.C. 154(b) by 343 days.

(21) Appl. No.: 17/694,848

(22) Filed: Mar. 15, 2022

(65) Prior Publication Data

US 2022/0297164 A1 Sep. 22, 2022

(30) Foreign Application Priority Data

Mar. 16, 2021 (CN) ......................... 202120541583.4

(51) Int. Cl.

| | |
|---|---|
| ***B08B 1/14*** | (2024.01) |
| ***B05B 13/02*** | (2006.01) |
| ***B08B 1/20*** | (2024.01) |
| ***B08B 13/00*** | (2006.01) |

(52) U.S. Cl.

CPC .......... *B08B 1/143* (2024.01); *B05B 13/0221* (2013.01); *B08B 1/20* (2024.01); *B08B 13/00* (2013.01)

(58) Field of Classification Search

CPC ......... A47L 9/068; A47L 9/0693; B08B 3/02; B08B 1/143

See application file for complete search history.

(56) References Cited

U.S. PATENT DOCUMENTS

| | | | | |
|---|---|---|---|---|
| 2016/0214144 | A1* | 7/2016 | Swanberg | B25J 11/0085 |
| 2020/0070522 | A1* | 3/2020 | Tarrida Tirado | B41J 2/16535 |
| 2020/0331288 | A1* | 10/2020 | Bentley | B44D 3/006 |
| 2021/0016327 | A1* | 1/2021 | Atake | B32B 5/26 |

* cited by examiner

*Primary Examiner* — Andrew A Horton

(74) *Attorney, Agent, or Firm* — ScienBiziP, P.C.

(57) ABSTRACT

A wiping device includes a rod, a spraying assembly, a base, and a translation module. The wiping paper is wound around the rod. The spraying assembly comprises a nozzle. The nozzle is arranged above the rod, and the nozzle is arranged towards the wiping paper. The base is used for fixing a workpiece. The translation module is coupled to the rod or the base. When the rod rotates around an axis of the rod, a wiping paper is wound around the rod. The nozzle could spray a cleaning agent to the wiping paper, then, the translation module could drive the rod and the base to move relatively, and the wiping paper wetted by the cleaning agent wipe the workpiece. The cleaning agent could wet the outermost layer of the wiping paper directly, so that the amount of the cleaning agent could be reduced.

4 Claims, 4 Drawing Sheets

WIPING DEVICE AND MACHINE

FIELD

The subject matter herein generally relates to a cleaning field, and more particularly to a wiping device and machine.

BACKGROUND

At present, a wiping paper is used for cleaning a steel mesh. Before the wiping paper touch the steel mesh, the wiping paper should be completely wetted. The wiping paper is wound on a rolling rod. A hollow space is dined in the rod, and a plurality of holes is defined in the rolling rod and in communication with the hollow space. A pump supplies a cleaning agent into the rolling rod. The cleaning agent flows through the holes and wet the wiping paper. When an outermost layer of the wiping paper is completely wetted, the wiping paper can be used for wiping the steel mesh.

In this method, the wiping paper is completely wetted during each wiping, excess cleaning agent may be wasted. In additional, scraps of the wiping paper can block the plurality of holes of the rolling rod.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
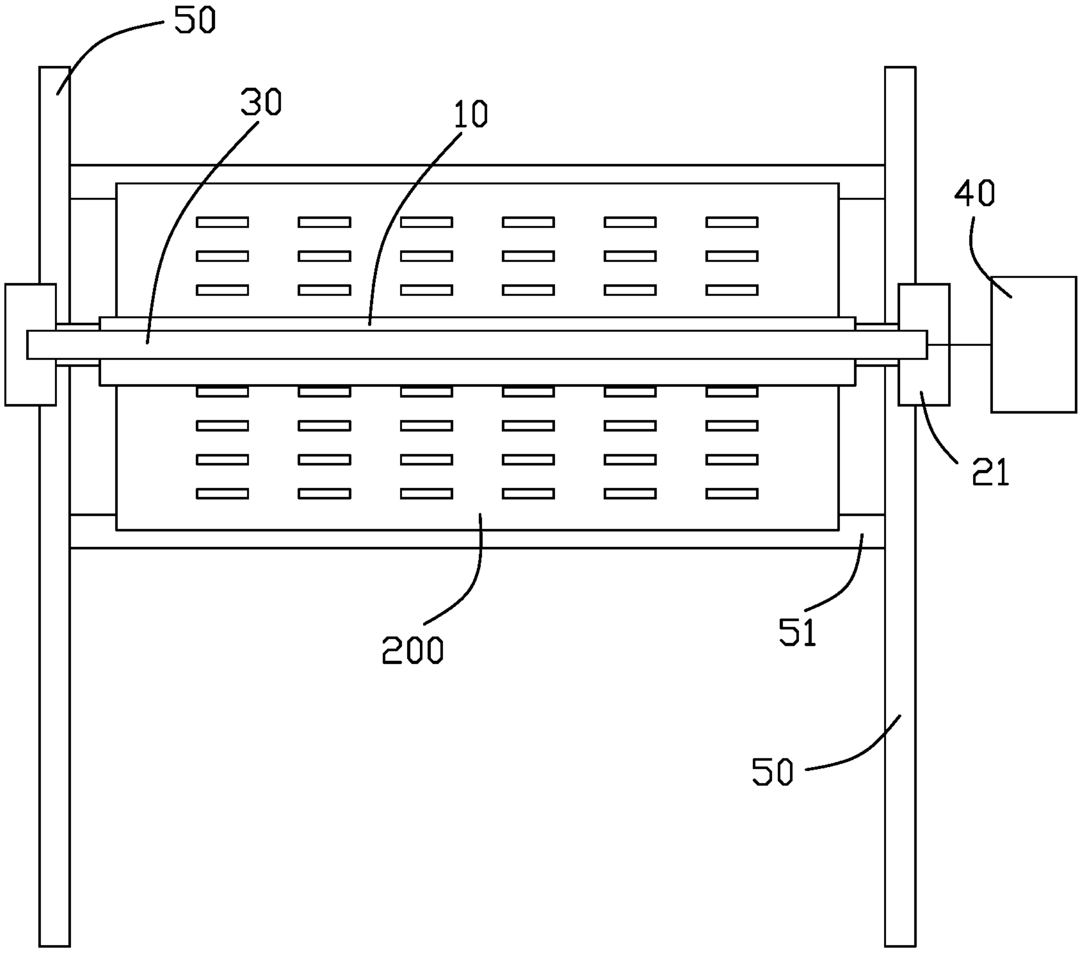
FIG. 1 is a schematic diagram of a wiping device according to an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one."

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series, and the like.

Without a given definition otherwise, all terms used have the same meaning as commonly understood by those skilled in the art. The terms used herein in the description of the present disclosure are for the purpose of describing specific embodiments only, and are not intended to limit the present disclosure.

Figure 2:
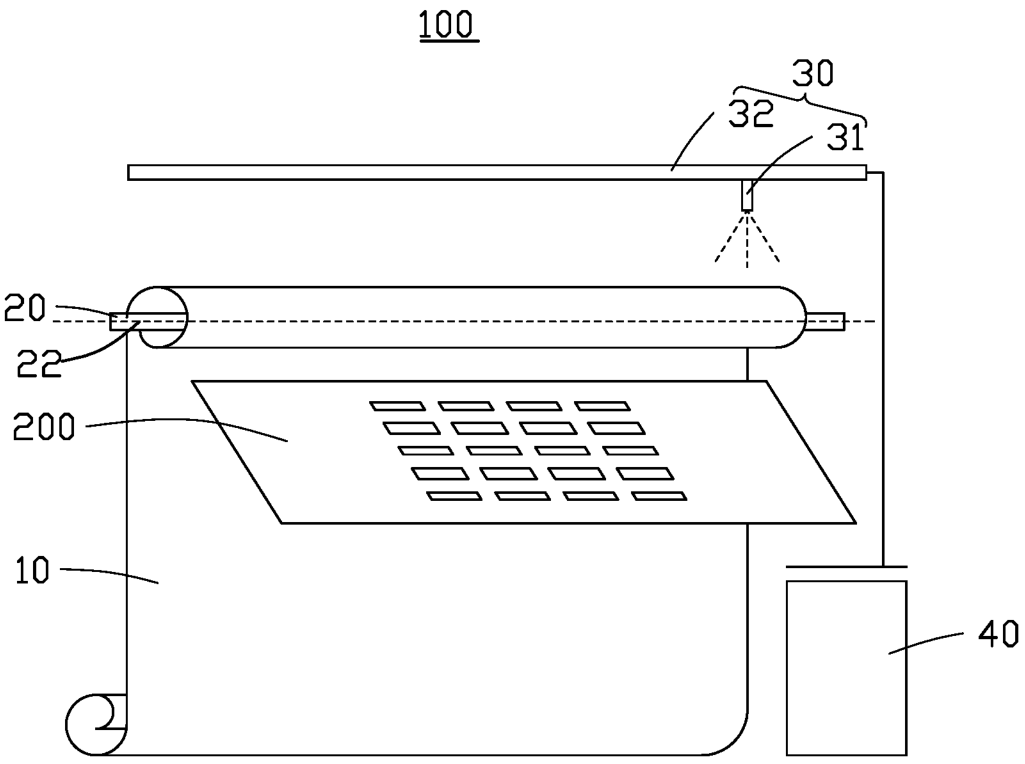
FIG. 2 is another schematic diagram of a wiping device according to an embodiment of the present disclosure.

As shown in FIGS. 1 and 2, a wiping device 100 of a first embodiment is provided for wiping and cleaning a workpiece 200. The wiping device 100 includes a rod 20, a base 51, and a spraying assembly 30. The base 51 is configured for securing the workpiece 200. The wiping device 100 further includes a wiping paper 10. The wiping paper 10 is coupled to the rod 20 for wiping a surface of the workpiece 200. The surface of the workpiece 200 is parallel to the horizontal plane. The rod 20 is set parallel to the horizontal plane, and one end of the wiping paper 10 is connected to the rod 20 along the first direction X. The first direction X is parallel to an axis 22 of the rod 20. The spraying assembly 30 includes at least one nozzle 31. The nozzle 31 is arranged towards the rod 20 and configured for spraying a cleaning agent to the wiping paper 10 wound on the rod 20. When the rod 20 is driven, the wiping paper 10 can be moved on a surface of the workpiece 200. The wiping paper 10 wetted by the cleaning agent can wipe the surface of the workpiece 200.

The workpiece 200 is a steel mesh. The wiping device 100 can wipe a mesh area of the steel mesh through the wiping paper 20. The wiping device 100 can also be used for wiping other types of workpieces.

The nozzle 31 is arranged above the rod 20, and configured for spraying the cleaning agent on the wiping paper 10 wound on the rod 20.

The rod 20 can rotate around the axis 22 of the rod 20. When the rod 20 rotates around the axis 22 of the rod 20, the wiping paper 10 can be driven to wind around the rod 20. The cleaning agent sprayed by the nozzle 31 can wet an outermost layer of the wiping paper 10 wound on the rod 20. When the rod 20 is rotated, an unwound portion of the wiping paper 10 forms a newly outermost layer, and the cleaning agent can wet the newly outermost layer. The cleaning agent sprayed by the nozzle 31 can directly wet the outermost layer of the wiping paper 10, so that the amount of the cleaning agent used is reduced. When the wiping paper 10 is wound on the rod 20, the nozzle 31 is arranged above the wiping paper 10, so that fallen scraps from the wiping paper 10 would not fall into the nozzle 31 for protecting the nozzle 31 from blocking.

The wiping device 100 further includes a translation module 50. The translation module 50 is coupled to the base 51. The translation module 50 is configured for driving the base 51 and the workpiece 200 to move relative to the rod 20, so that the wiping paper 10 wetted by the cleaning agent can move on the surface of the workpiece 200 and wipe the workpiece 200. In another embodiment, the translation module 50 can also be coupled to the rod 20. The translation module 50 is configured for driving the rod 20 to move relative to the base 51 and the workpiece 200, so that the wiping paper 10 wetted by the cleaning agent can move on the surface of the workpiece 200 and wipe the workpiece 200.

In one embodiment, the workpiece 200 is driven by the translation module 50 to move relative to the wiping paper 10 along a second direction Y. The second direction Y is perpendicular to the axis 22 of the rod 20. When the base 51 and workpiece 200 is driven to move relative to the wiping paper 10 along the second direction Y, the workpiece 200 would not drive the wiping paper 10 to move relative to the rod 20 along the first direction X, so that the dynamic friction between the wiping paper 10 and the rod 20 can be reduced.

In another embodiment, the rod 20 is driven by the translation module 50 to move relative to the workpiece 200 along the second direction Y. When the rod 20 is moved relative to the workpiece 200 along the second direction Y, the wiping paper 10 would move relative to the workpiece 200, and the workpiece 200 would not drive the wiping paper 10 to move relative to the rod 20 along the first direction X, so that the dynamic friction between the wiping paper 10 and the rod 20 can be reduced.

The spraying assembly 30 includes a rail 32. The rail 32 extends along the first direction X. The nozzle 31 is slidably coupled to the rail 32, and arranged towards the wiping paper 10. When the nozzle 31 slides on the rail 32, the nozzle 31 sprays the cleaning agent to different portions of the wiping paper 10. If there is only a dirty area of the workpiece 200 needs to be wiped, the nozzle 31 can be driven to spray the cleaning agent to the portion of the wiping paper 10 corresponding to the dirty area. Other portions of wiping paper 10 do not need to be wetted, so that the amount of the cleaning agent used can be reduced.

In one embodiment, a spray area is defined by the nozzle. The whole rod 20 is in the spray area, that is, the spray area covers the whole rod 20. The nozzle 31 is slidably coupled to the rail 32, and arranged towards the wiping paper 10. The nozzle 31 can slide along the first direction X to spray the cleaning agent to the different portions of the wiping paper 10. In another embodiment, a spray area of one nozzle 31 can cover the whole rod 20. The nozzle 31 is fixedly coupled to the rail 32, and arranged towards the wiping paper 10.

Figure 3:
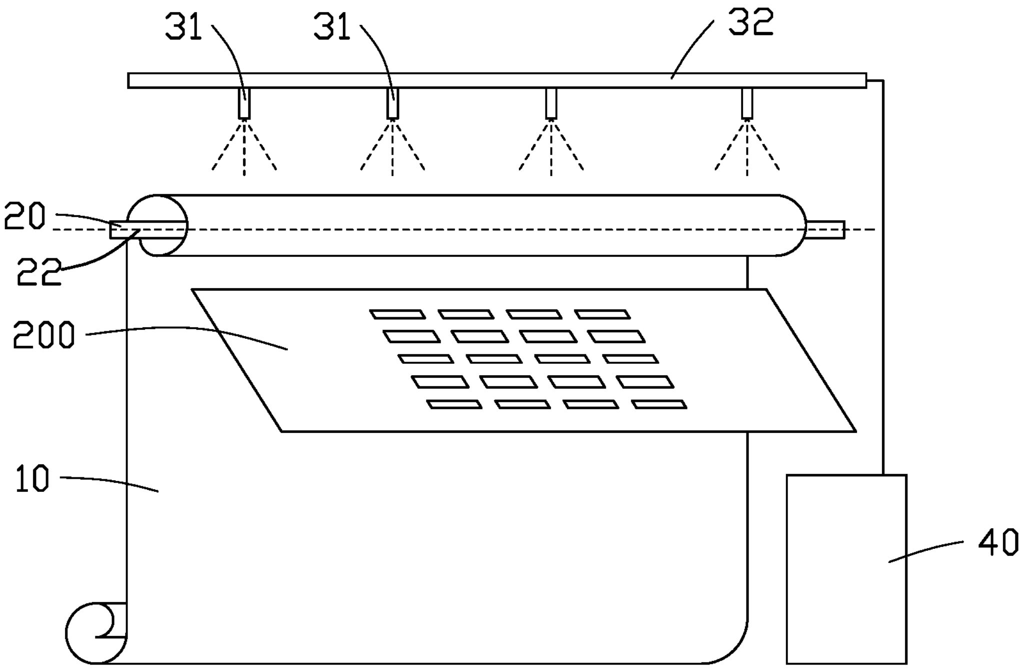
FIG. 3 is a schematic structural diagram of a wiping device according to another embodiment of the present disclosure.

As shown in FIG. 3, a wiping device 100 of a second embodiment is provided for wiping and cleaning a workpiece 200. A plurality of nozzles 31 is slidably coupled to the rail 32. If there is only a dirty area of the workpiece 200 that needs to be wiped, the nozzles 31 can be driven to get closer to each other, and wet a part of the wiping paper 10 corresponding to the dirty area together. If there is only a dirty area of the workpiece 200 that needs to be wiped, the nozzles 31 corresponding to the dirty area can be opened to spray the cleaning agent to the wiping paper 10, and other nozzles 31 can be closed to save the amount of the cleaning agent used. If the whole workpiece 200 needs to be wiped, the nozzle 31 can be driven to a scattered position, and wet the whole wiping paper 10.

As shown in FIGS. 2 and 3, the wiping device 100 includes a pump 40. The pump 40 is in communication with the rail 32, and configured for supplying the cleaning agent to the nozzle 31 on the rail 32. The spraying assembly 30 further includes a plurality of valves. Each nozzle 31 is coupled to a valve, and the opening and closing of the nozzle 31 can be controlled by the valve.

Figure 4:
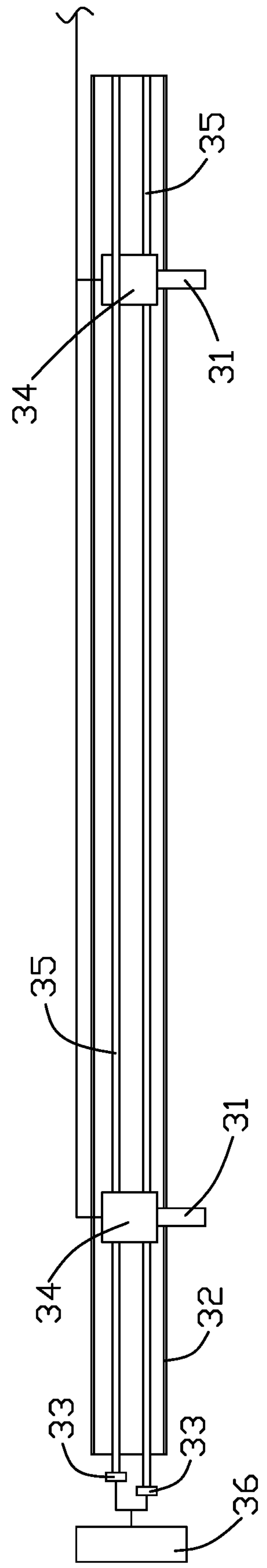
FIG. 4 is a cross-sectional view of a rail according to an embodiment of the present disclosure.

As shown in FIG. 4, the spraying assembly 30 includes a translation driver 33, a slider 34, and a lead screw 35. The slider 34 is slidably coupled to the rail 32, the nozzle 31 is fixedly coupled to the slider 34. A threaded hole is defined on the slider 34. The slider 34 is coupled to the lead screw 35 by the threaded hole, and the lead screw 35 is coupled to the translation driver 33. The translation driver 33 can rotate the lead screw 35 around an axis of the lead screw 35. When the lead screw 35 rotates around the axis of the lead screw 35, the slider 34 and the nozzle 31 can be driven to move along the first direction X. The translation driver 33 can be a motor. A rotor of the motor is coupled to the lead screw 35.

The wiping device 100 further includes a controller 36. The controller 36 is coupled to the translation driver 33 for controlling the rotation of the lead screw 35. An operation panel is defined on the controller 36. When an operator wants to controller the rotation of the translation driver 33, the operator can input operation parameters through the operation panel.

In one embodiment, the wiping device 100 includes a rotation driver 21. The rotation driver 21 is coupled to the rod 20 to rotate the rod 20 around the axis of the rod 20. By rotating the rod 20 around the axis of the rod 20, the wiping paper 20 gradually wound around the rod 20.

A machine that includes the wiping device 100 is also disclosed in the present disclosure. The machine is provided for wiping the workpiece 200.

As described above, the wiping device 100 is configured for spraying the cleaning agent to the outermost layer of the wiping paper 10 directly, so that the cleaning agent can wet the outermost layer of the wiping paper 10 directly. The amount of the cleaning agent can be reduced. When the wiping paper 10 is wound on the rod 20, the nozzle 31 is arranged above the wiping paper 10, so that fallen scraps from the wiping paper 10 would not fall into the nozzle 31 to protect the nozzle 31 from blocking. The machine that includes the wiping device achieves the purpose of ensuring the wiping effect and saving the amount of the cleaning agent used.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A wiping device comprising:

a base configured for securing a workpiece;

a rod installed on the base and configured for winding a wiping paper;

a spraying assembly installed on the base, the spraying assembly comprising a plurality of nozzles spaced from the rod, the plurality of nozzles being arranged above the rod and being configured for spraying a cleaning agent on the wiping paper wound on the rod; and a translation module coupled to the base, and being controllable to move the base and the workpiece relative to the rod, wherein:

when the rod is rotated, the wiping paper is driven to wind around the rod, the plurality of nozzles spray the cleaning agent to wet a portion of the wiping paper, the translation module drives the base and the workpiece to move relative to the rod, the wiping paper is moved on a surface of the workpiece, the wiping paper wetted by the cleaning agent can wipe the surface of the workpiece;

the workpiece is a steel mesh, the wiping device wipes a mesh area of the steel mesh through the wiping paper;

the spraying assembly further comprises a rail, the rail extends along a first direction, the first direction is parallel to an axis of the rod, the plurality of nozzles are slidably coupled to the rail, the plurality of nozzles can be driven to get closer to each other to wet a part of the wiping paper corresponding to a dirty area of the workpiece; the plurality of nozzles can be driven to a scattered position to wipe the whole workpiece.

2. The wiping device of claim 1, further comprising a pump, wherein: the pump is coupled to the plurality of nozzles, and the pump is configured for supplying the cleaning agent to the plurality of nozzles.

3. The wiping device of claim 1, further comprising a rotation driver, wherein: the rotation driver is coupled to the rod for rotating the rod around the axis of the rod.

4. A machine equipment comprising a wiping device, the wiping device comprising:

a base configured for securing a workpiece;

a rod installed on the base and configured for winding a wiping paper;

a spraying assembly installed on the base, the spraying assembly comprising a nozzle a plurality of nozzles spaced from the rod, the plurality of nozzles being arranged above the rod and being configured for spraying a cleaning agent on the wiping paper wound on the rod; and a translation module coupled to the base, and being controllable to move the base and the workpiece relative to the rod, wherein:

when the rod is rotated, the wiping paper is driven to wind around the rod, the plurality of nozzles spray the cleaning agent to wet a portion of the wiping paper, the translation module drives the base and the workpiece to move relative to the rod, the wiping paper is moved on a surface of the workpiece, the wiping paper wetted by the cleaning agent can wipe the surface of the workpiece;

the workpiece is a steel mesh, the wiping device wipes a mesh area of the steel mesh through the wiping paper;

the spraying assembly further comprises a rail, the rail extends along a first direction, the first direction is parallel to an axis of the rod, the plurality of nozzles are slidably coupled to the rail, the plurality of nozzles can be driven to get closer to each other to wet a part of the wiping paper corresponding to a dirty area of the workpiece; the plurality of nozzles can be driven to a scattered position to wipe the whole workpiece.

* * * * *